United States Patent [19]
Cox, Jr.

[11] 3,726,547
[45] Apr. 10, 1973

[54] CONNECTOR FOR FLEXIBLE NON-METALLIC CONDUIT

[75] Inventor: John A. Cox, Jr., Sycamore, Ill.

[73] Assignee: Ideal Industries, Inc., Sycamore, Ill.

[22] Filed: May 17, 1971

[21] Appl. No.: 144,006

Related U.S. Application Data

[63] Continuation-in-part of Ser. No. 818,905, April 24, 1969, abandoned.

[52] U.S. Cl. ..................285/174, 174/89, 285/251
[51] Int. Cl. ...............................................F16l 55/00
[58] Field of Search..................285/251, 245, 330, 285/331, 256, 158, 259, 174, 161, 149; 174/89; 138/109

[56] References Cited

UNITED STATES PATENTS

| | | | |
|---|---|---|---|
| 2,782,060 | 2/1957 | Appleton | 285/251 X |
| 3,055,683 | 9/1962 | Appleton | 285/158 |
| 1,440,508 | 1/1923 | Todd | 285/174 X |
| 2,814,862 | 12/1957 | Heckethorn | 285/174 X |
| 3,441,296 | 4/1969 | Wilkin | 285/174 |

FOREIGN PATENTS OR APPLICATIONS 925,326   3/1955   Germany..........................285/256

Primary Examiner—Dave W. Arola
Attorney—Parker, Carter & Markey

[57] ABSTRACT

This is concerned with a connector for joining non-metallic conduit or tubing to a terminus, for example a box, junction or the like. The connector takes the form of a housing with a tapered interior and an all-plastic pilot projecting therefrom at the large end with threads on the surface thereof which are constructed and adapted to bite into the inner surface of non-metallic conduit. The tapered inner surface or bore of the housing also has threads which have the same pitch as the threads on the pilot. The pilot is joined to the small end of the passage through the housing by a non-rotatable joint and secured there so that the two parts will turn as one unit. The housing and pilot or insert are held by a free-wheeling connection on the flanged end of a body member by a nousing nut which may be either metal or plastic. The body element is constructed to be inserted into an opening in a box, junction or what-have-you and sealed in place.

7 Claims, 5 Drawing Figures

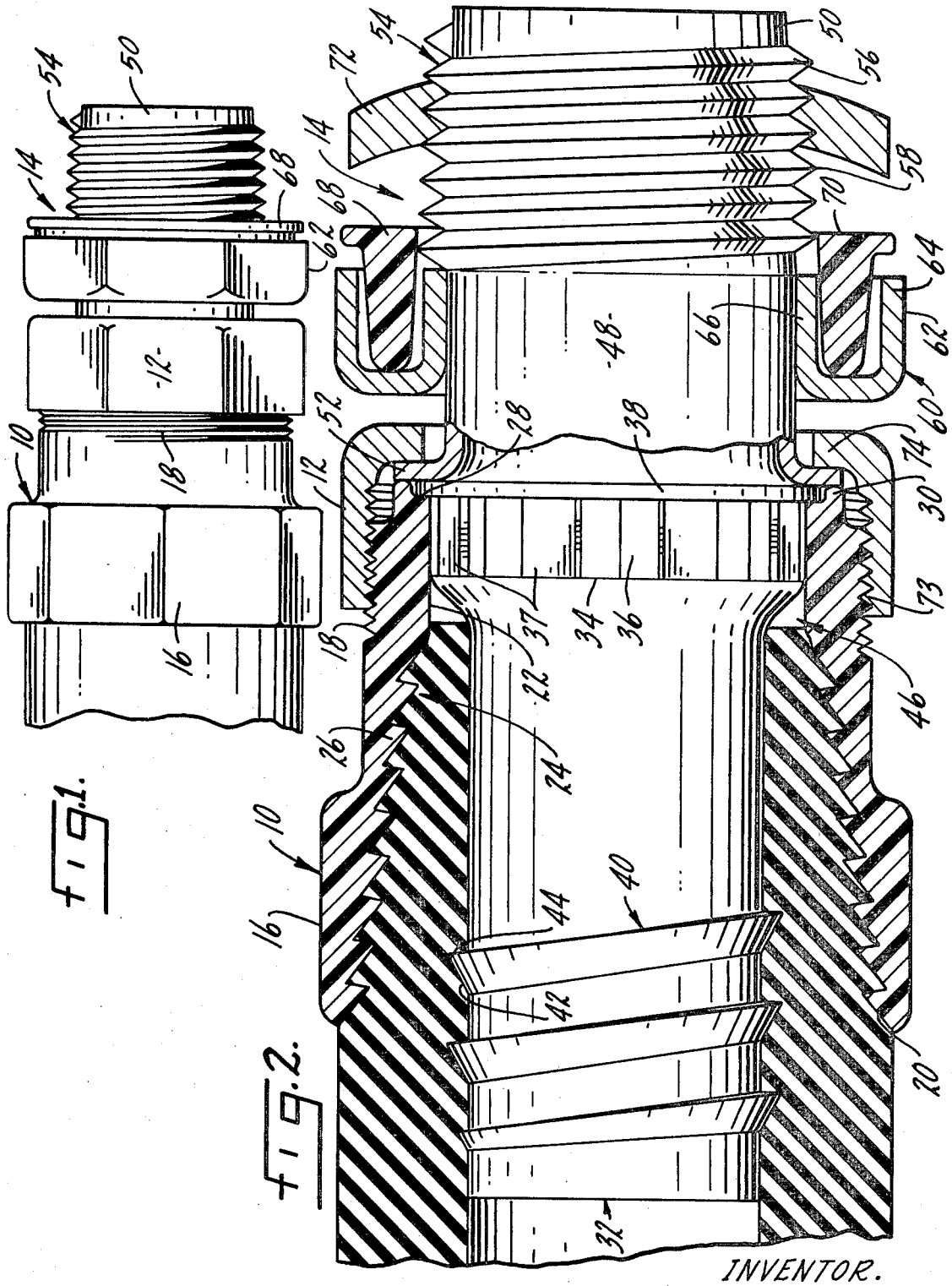

PATENTED APR 10 1973 3,726,547

INVENTOR.
John A. Cox, Jr.
BY Parker, Carter & Markey
Attorneys.

CONNECTOR FOR FLEXIBLE NON-METALLIC CONDUIT

This is a continuation-in-part of copending application Ser. No. 818,905, filed Apr. 24, 1969, now abandoned.

SUMMARY OF THE INVENTION

This invention is concerned with a connector for joining non-metallic flexible conduit to a terminus, such as an electrical junction box or the like.

The primary object of the invention is an all-plastic connector of the above type which is much less expensive than metal units.

Another object is a plastic connector intended for joining non-metallic conduit to a box in which the connector free-wheels on a body member but which can be easily tightened thereon to provide a completely moisture-proof structurally rigid joint.

Another object is a plastic connector for non-metallic conduit which avoids the expense of casting and machining.

Another object is a connector of the above type which is lightweight, pleasant in appearance and must less expensive than prior units.

Another object is a plastic connector for joining flexible non-metallic conduit to a box which provides a tight grip and seal on the end of the conduit.

Another object has a plastic connector of the above type which may use either a metal or a plastic housing nut.

Another object is a plastic connector of the above type which engages the flexible non-metallic conduit in a new and novel manner.

Other objects will appear from time to time in the ensuing specification and drawings.

BRIEF DESCRIPTION OF THE DRAWINGS

FIG. 1 is a side view of the connector on the end of a conduit;

FIG. 2 is a side view of the connector of FIG. 1, partly in section and on an enlarged scale;

DESCRIPTION OF THE PREFERRED EMBODIMENT

Figure 3:
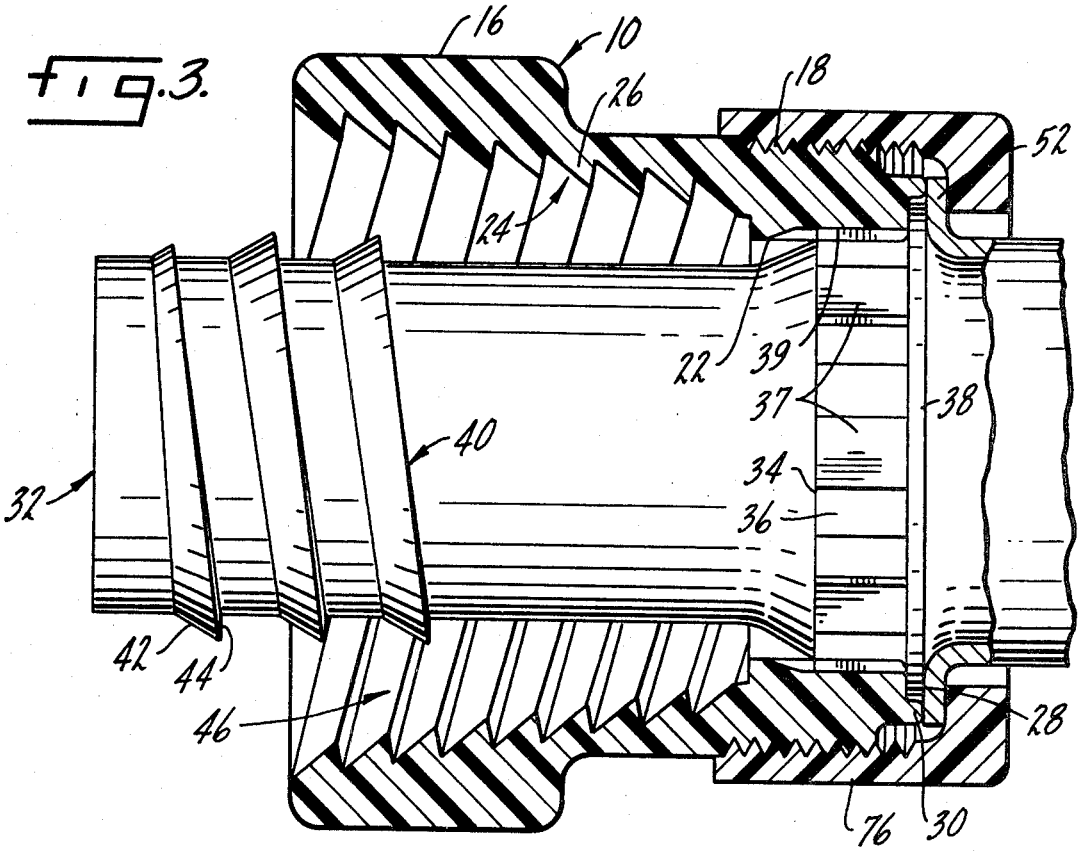
FIG. 3 is like FIG. 2 but of a variant form.
Figure 4:
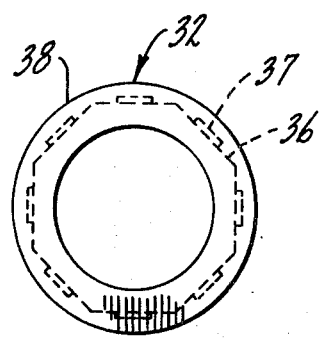
FIG. 4 is a right end view, on a reduced scale, of the pilot of either FIG. 2 or FIG. 3.
Figure 5:
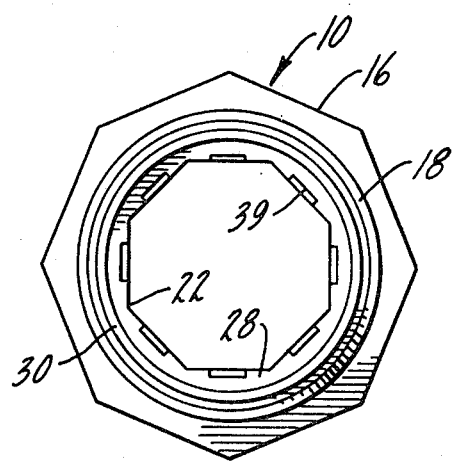
FIG. 5 is a right end view, on a reduced scale, of the housing of either FIG. 2 or FIG. 3.

In FIG. 1 a connector for flexible non-metallic conduit is shown and includes the housing or adapter 10, a housing nut 12, and a body member 14, each of which will be explained in detail.

Considering the housing 10 first, it is shown in the general shape of a generally tubular, cylindrical all-plastic sleeve enlarged at one end, as at 16, into an octagon surface or any suitable wrench-receiving surface having a number of flat sides. At the other end a certain length of thread 18 is provided as explained hereinafter.

The interior of the housing is generally open in the form of a passage extending from a large end at 20 to a small end 22 with a generally tapered surface 24 in between which has threads 26 thereon. The inner or small end 22 may be considered to be generally cylindrical although it too has a slight taper. An offset 28 is provided at the other end to define outwardly thereof as axially projecting annulus 30 which functions as a seal, as explained hereinafter.

A pilot 32 is positioned in the housing and is shown as mounted at the small end of the passage and extending a substantial distance beyond the large end. The other end of the pilot expands to an enlargement 34 which has a plurality of flats 36 with projections 37 thereon which enables it to be keyed or otherwise fitted into the small end of the housing. A generally circular flange 38 is provided around the rim of the pilot and fits into the offset 28 of the housing when the parts are assembled.

The housing and pilot are made or molded as separate and distinct parts and then are assembled into the position shown and ultrasonically welded, glued, or otherwise suitably connected at the small end of the passage. The flats between the mating surfaces with the projections 37 fitting in grooves 39 firmly interlock the two so that they will rotate as a unit when the insert is being screwed into the end of a piece of flexible non-metallic conduit.

A part of the surface of the pilot is provided with threads 40 which are of a special form to assist insertion into the end of the conduit and second to firmly interlock the pilot to conduit and hold it in place. As shown the threads are similar to buttress threads in that the leading flank 42 is in a much more pronounced angle, for example 60°, to a radius than is the trailing flank 44. The same is true of the threads 26 on the internal taper of the housing. Note that the threads cover the portion of the pilot that extends beyond the open end of the housing and also extends into the housing a short distance. The threads 26 in the tapered surface of the housing are of a similar construction but extend throughout the length of the compression chamber 46 defined between these two surfaces.

The body 14 may be made in a manner the same as or similar to what is shown and described in prior U.S. Pat. No. 3,542,406, issued Nov. 24, 1970, and assigned to this assignee. The body may be drawn from flat or rolled stock into a generally cylindrical shape 48 with a taper 50 at one end and a flange 52 at the other. A thread form 54 may be on the taper 50 and may be made by coiling a wire 56 of suitable length into a generally cylindrical coil, and then slipping it over the outer surface 50. The wire is shown as having a triangular cross-section with one flat side being exposed on the inside of the resulting coil so that the inner surface of the coil presents a smooth cylindrical appearance with the outer edge or point 58 of the triangle forming the crest of the resultant thread. Wire that is triangular in cross-section is particularly appropriate since the sides or flanks of the threads resulting from the triangle will be at 60° which is appropriate for pipe threads.

The wire may be coiled to an internal diameter that is slightly smaller than the outside diameter of the body member so that when the cylindrical inner surface of the coil is slipped onto the body member, the coil will be slightly expanded which will thereby give a slight compression or loaded fit. The degree of interference should be sufficiently small so that no great effort is necessary to assemble the two. A combination octagon and seal 60 is positioned on the body and may take the form of an annular retainer 62 which is C-shaped in cross-section, as shown in FIG. 2, with an outer leg 64 that is an octagon or any other multiple-sided figure and suitable for a wrench and an inner leg 66 that is cylindrical. The interior of the octagon may open toward the threads 54 and may be fitted with a seal or grommet 68 which is tapered into the octagon and extends beyond the open end to a flat face 70 which engages and seals against the wall or side of a housing or junction box. The threads 54 may be provided with the usual lock washer or nut 72.

The housing nut 12, which may be metal, is threaded at 73 matching the threads 18 on the outside of the housing and has a turned down flange 74 which overlaps the outstanding flange 52 on the body. The housing nut as shown in FIG. 2 is made of metal and may have an octagon exterior or any suitable number of sides, other than round, to accept a wrench.

As shown in FIG. 3, the housing nut 76 may be molded of plastic with all the other parts being the same.

The use, operation, and function of my invention are as follows.

Connectors of this general type are intended for joining flexible non-metallic conduit to a terminus, such as a terminal, box or the like. A flexible non-metallic conduit is shown in FIG. 2 and may be assumed to be made of neoprene, rubber, plastic or any suitable flexible insulating material. The connector may be used by first inserting the pilot or insert 32 into the open end of the conduit and then turning it in until the threads 40 bite into the inner wall with the blunt side 42 of the threads leading and the sharp side or flank 44 following giving the threads ease of entry but solid resistance against withdrawal. The threads on the pilot will bite first and should have the same pitch as the tapered threads 24 so that when the tapered threads begin to indent the outer surface of the conduit, they will be directly synchronized to the inward movement of the conduit which will be due primarily to the pilot grip. The compression chamber 46 between the threads slowly narrows inwardly so that the conduit will have the tendency to be distorted forwardly. As shown, the threads on the pilot are single-start threads while those in the housing are multiple-start threads.

When the conduit is fully seated in the connector, the octagon 16 on the housing can be held stationary and the housing nut 12 turned which closes the housing against the flange 52 on the body until the sealing lip or annulus 30 fully seats against the flange 52. The entire assembly can be finger or wrenched tight, depending upon the installation or application. When they are loose, the housing and housing nut will free-wheel or freely rotate on the flange of the body member.

In certain installations the free-wheeling aspect of the housing and housing nut has the advantage that they can be disassembled and the housing or housing nut can be mounted separately in the end of flexible conduit on a separate or preliminary basis. For example, a number of body elements and housing nuts could be assembled on boxes or junctions. A number of fittings could be pre-inserted into selected lengths of flexible conduit and brought to the job site en masse with the connections to be made there. This unit makes it possible so that the operator just attaches the adapter to the conduit. There are no pieces to lose or misplace.

While I have referred to certain parts as being in the shape of an octagon, it should be understood that they may have any number of sides. An octagon, however, is quite common in this field.

The function of the pilot 32 and the inner surface 24 of the outer housing which has the buttress thread is that first the non-metallic conduit comes into contact with the threads 40 on the pilot. This pulls the non-metallic conduit up to the point where it contacts the inner tapered surface threads 26 of the outer housing. At that time the thread of the pilot is sufficiently engaged to the non-metallic conduit that it pulls the non-metallic conduit into position to where the outer housing with its internal threads can grip and literally forces it into the internal threads. When the non-metallic conduit is sufficiently drawn in the internal thread it is compressed against the pilot in the area where the pilot thread 40 leaves off. This is continually compressed until the fitting cannot be turned or tightened to any greater degree. Therefore, there are two areas of interest: first, the compression section which is in the upper or inner end on the fitting, and second, a section which has mechanical interference with the conduit at the front end which is brought about by the buttress threads on the pilot.

When this fitting is subjected to a tensile force the conduit tends to neck down. The section where the conduit is under compression prevents the conduit from moving as the force is applied. This reduces the section of the conduit immediately at the front end of the pilot, compressing the outer surface of the non-metallic conduit against the threads on the pilot at the front creating greater and greater resistance to removal. The more you pull the tighter it gets. This is only true if movement is prevented by compressing the non-metallic conduit against the outer surface of the pilot up in the throat area of the fitting.

The tapered internal threads 26 in the outer housing extend all the way in to the fitting to help and assist pulling the non-metallic conduit in place. As the non-metallic conduit is forced up in the throat of this fitting, it is in a compressed condition. This insures that there is enough engagement in the outer surface to prevent stripping of the thread against the outer surface of the non-metallic conduit and providing enough force to move the conduit completely into position and compression.

The threads 40 do not continue farther up into the housing because they create greater resistance for the compression of the non-metallic conduit. Sufficient thread area 40 must provide enough friction to withstand the sheer force of non-metallic conduit during removal. Also, the conduit must be compressed sufficiently tight behind the threads to prevent the conduit sliding or moving in relationship to the pilot or the outer housing. For this reason the non-metallic conduit is compressed behind the thread detail 40 instead of on the thread detail.

While this is the preferred form and several variations have been shown and suggested, it should be understood that suitable additional modifications, changes, substitutions, and alterations may be made without departing from the invention's fundamental theme.

I claim:

1. In a connector assembly for joining non-metallic conduit to a terminus, an all-plastic generally cylindrical housing with a generally open interior passage, larger at one end than the other and generally tapered in between, a generally tubular all-plastic pilot in the passage extending beyond the large end thereof, means forming a non-rotatable joint between the inner end of the pilot and the small end of the passage, male threads on the pilot extending from outside the passage inwardly at least past the large end of the passage, and internal threads in the tapered portion of the housing passage overlapping the male threads on the pilot a limited extent with the internal threads extending inwardly a substantial distance beyond the male threads on the pilot, the male threads on the pilot extending outwardly a substantial distance beyond the internal threads in the housing passage, both sets of threads having a shallow leading flank and a steep trailing flank and being of the same pitch.

2. The structure of claim 1 further characterized by and including a seal on the housing and movable therewith, the seal being a integral part of the housing and in the form of an annulus extending in the opposite direction from the pilot.

3. The structure of claim 1 further characterized in that the means forming the non-rotatable joint includes a series of flats on the inner end of the pilot engaging a corresponding series of flats in the small end of the housing.

4. The structure of claim 3 further characterized in that the flats on the pilot are ultrasonically welded to the flats on the housing.

5. A connector assembly for attaching flexible non-metallic conduit to a terminus, including a body, an all-plastic generally cylindrical housing with a generally open interior passage, larger at one end than at the other and generally tapered in between, external threads on the other end of the housing, a housing nut flanged to the body so as to freely rotate thereon having internal threads engaging the external threads on the housing so that rotation thereof relative to the housing will draw the housing toward the body, a generally tubular all-plastic pilot in the passage extending toward and beyond the large end thereof, means forming a non-rotatable joint between the inner end of the pilot and the small end of the passage, and male threads on the pilot projecting from said one end and adapted to be rotatably inserted into the end of flexible non-metallic conduit so as to draw the conduit into sealing engagement with the internal tapered surface in the housing.

6. The structure of claim 5 further characterized in that the housing nut is made of sheet metal.

7. The structure of claim 5 further characterized in that the housing nut is made of plastic.

* * * * *